United States Patent [19]
Yokoi

[11] Patent Number: 4,568,080
[45] Date of Patent: * Feb. 4, 1986

[54] DISPLAY APPARATUS

[75] Inventor: Gunpei Yokoi, Kyoto, Japan

[73] Assignee: Nintendo Co., Ltd., Kyoto, Japan

[*] Notice: The portion of the term of this patent subsequent to Sep. 6, 2000 has been disclaimed.

[21] Appl. No.: 490,725

[22] Filed: May 2, 1983

Related U.S. Application Data

[63] Continuation-in-part of Ser. No. 256,257, Apr. 22, 1981, Pat. No. 4,403,216.

[30] Foreign Application Priority Data

Dec. 11, 1980 [JP] Japan .................................. 55-178636
Dec. 29, 1980 [JP] Japan .................................. 55-187780
Feb. 28, 1981 [JP] Japan .................................. 56-27825

[51] Int. Cl.$^4$ ............................................. G06F 3/14
[52] U.S. Cl. .............................. 273/1 GC; 273/85 G;
340/705; 340/784; 340/700; 340/702; 40/365; 40/448
[58] Field of Search ................ 273/1 GC, 85 G, 237; 340/700, 701, 702, 705, 765, 784; 40/363, 365, 448, 571

[56] References Cited

U.S. PATENT DOCUMENTS

T936,004  7/1975  Willis .................................. 340/784
2,260,721 10/1941  Linsell .................................. 178/7.5
4,188,779  2/1980  Fatton .................................. 273/138 A

FOREIGN PATENT DOCUMENTS 3008294  9/1980  Fed. Rep. of Germany .
3022543  1/1981  Fed. Rep. of Germany .
3029122  2/1981  Fed. Rep. of Germany .
1421290  1/1976  United Kingdom .
1464875  2/1977  United Kingdom .

OTHER PUBLICATIONS

Japanese Patent Appln. No. 24481/1979*; filed: 3/5/79; Inventor: F. Nakano et al., Pat. Laying-Open No.: 118077/1980; Date: 9/10/80, (5 pages in all) *& partial translation thereof.
Japanese Patent Appln. No. 139875/1973*; filed: 12/14/73; Inventor: S. Suzuki et al., Pat. Laying-Open No.: 92153/1975; Date: 7/23/75, (5 pages in all) *& partial translation thereof.

Primary Examiner—Richard C. Pinkham
Assistant Examiner—Leo P. Picard
Attorney, Agent, or Firm—W. G. Fasse; D. H. Kane, Jr.

[57] ABSTRACT

A liquid crystal display apparatus comprising first and second housing portions. The first and second housing portions are coupled so that the angle of the opposing surfaces may be adjustable. A light transmitting portion is formed on the upper surface of the first housing portion. Light received by the light transmitting portion is further transmitted through a liquid crystal plate and a colored filter housed in the first housing portion and impinges upon a mirror provided in the second housing portion. An image formed on the liquid crystal plate can be observed as a multicolored image through light reflected from the mirror. The image may be observed through a viewing window.

17 Claims, 17 Drawing Figures

DISPLAY APPARATUS

CROSS-REFERENCE TO RELATED APPLICATION

The present application is a Continuation-In-Part application of U.S. Ser. No. 256,257, filed in the U.S. on Apr. 22, 1981, now U.S. Pat. No. 4,403,216.

BACKGROUND OF THE INVENTION

1. Field of the Invention

The present invention relates to a display apparatus and more particularly to a liquid crystal display suited for a hand-held or desk-top game apparatus.

2. Description of the Prior Art

Figure 1:
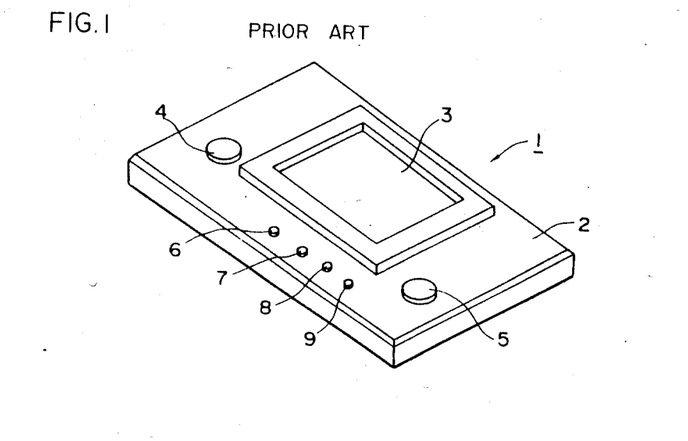
FIG. 1 is a perspective view of an example of a hand-held type conventional game apparatus with a liquid crystal display.

FIG. 1 is a perspective view showing a hand-held type game apparatus including a conventional liquid crystal display 1. Such a game apparatus may be similar to that disclosed in the copending U.S. patent application Ser. No. 161,344 now U.S. Pat. No. 4,438,926.

Referring to FIG. 1, a housing 2 comprises a liquid crystal display portion 3 located near the upper surface of the housing 2. The housing 2 further comprises at other portions of the upper surface thereof game mode switches 6 to 9 for starting a game mode and for selecting the degree of difficulty of playing a game. Character moving and/or changing switches 4 and 5 are provided for moving and changing a predetermined character being displayed on the liquid crystal display portion 3.

Usually such liquid crystal display comprises a reflecting plate, not shown, on the rear surface of the liquid crystal display portion 3, i.e. on the surface of the housing 2. Light incident on the liquid crystal display portion 3 from outside the housing 2 is transmitted through the liquid crystal display portion 3 and then the light is reflected from the reflecting plate, not shown, provided on the rear surface thereof and is again led outside the liquid crystal display portion 3 after transmission through the liquid crystal display portion 3. However, in the case where a segment electrode, not shown, formed in the liquid crystal display portion 3 is driven for display, the light incident on the segment electrode portion is scattered or absorbed depending on the nature of the liquid crystal, with the result that the light does not reach the reflecting plate. Accordingly, the segment electrode portion being driven for display becomes considerably lower in brightness than that in the other portions, whereby the difference in brightness produces an image being displayed on the liquid crystal display portion 3. More specifically, a user observes light reflected from the liquid crystal display portion 3, whereby the information being displayed by the liquid crystal display portion 3 becomes visible.

However, since the conventional liquid crystal display 1 has at the same side a light receiving surface where a light from outside is received by the liquid crystal display portion 3 and a light image observing surface where an image being displayed by light reflected from the liquid crystal display portion 3, it could happen that the image becomes difficult to be observed depending on the surrounding brightness and the angle at which the liquid crystal display portion 3 is observed. This problem is based on the following facts. More specifically, if the surrounding brightness in observing the liquid crystal display 1 is dark, the absolute amount of light impinging on the liquid crystal display 3 is decreased, whereby the contrast between the segment electrode portion being driven for display and the portion other than the driven portion is decreased, whereby discrimination becomes less easy. Conversely, if the surrounding brightness in which the liquid crystal display 1 is observed is increased, an ample amount of light is obtained and the above described problem will be eliminated. However, in such a case an amount of a light being reflected from an outer glass surface of the liquid crystal display portion 3 is accordingly increased. Therefore, depending on the angle at which the liquid crystal display portion 3 is observed, an amount of the light being reflected from the outer glass surface of the liquid crystal display portion 3 becomes larger than that reflected from the reflecting plate. In such a case, it becomes again difficult for a user to discern a background area as viewed on the outer glass surface and the image being displayed on the liquid crystal display portion 3. For example, if and when a light source per se is seen on the outer glass surface, the image being displayed is hardly visible. In particular, since a hand-held electronic device such as a game apparatus, a pocket calculator, an electronic wristwatch, and the like having a liquid crystal display are observed by a user while the same are held by hand, a viewing direction and an outer light direction are not constant and accordingly the above described problems become even more pronounced.

SUMMARY OF THE INVENTION

Briefly, the display according to the invention comprises a liquid crystal plate housed inside a housing. The housing has a light transmitting portion formed on a first side surface for transmitting light therethrough and a window formed on a second side surface. The housing is further provided with a mirror on the surface thereof or inside thereof having a predetermined position or an angle relation with respect to the liquid crystal plate. The window is located in the path of the light reflected by the mirror and an image being formed by the liquid crystal plate upon transmission of light from the light transmitting portion is observed through the window.

According to the present invention, the liquid crystal plate and the mirror are disposed in a predetermined positional relationship to each other in the housing having a light transmitting portion and a viewing window in different housing walls. The housing is so constructed that it has a predetermined use attitude relative to the vertical, whereby the viewing window provides a given angular observation range. Thus, a clear image is displayed and can be observed without being influenced by the surrounding brightness.

In another preferred embodiment of the present invention, the display apparatus comprises first and second housing portions. The first housing portion is provided with a light transmitting portion, whereas the second housing portion is provided with a mirror at a predetermined position. The first and second housing portions are coupled to each other so that the surface opposing angle may be adjustable. As a result, light from the light transmitting portion is transmitted through the liquid crystal plate housed in the first housing portion and impinges upon the mirror in the second housing portion. The respective image formed on the liquid crystal plate can be observed by a light beam reflected by the mirror. The first and second housing portions may be constructed to be foldable. Thus, by dividing the housing into the first and second housing portions, a compact display device is obtained. As a result, the present invention is suited for a liquid crystal display such as a hand-held game apparatus or a desk-top type game apparatus.

Accordingly, a principal object of the present invention is to provide a display that is capable of displaying an image with substantial clearness, without being influenced by the surrounding brightness.

Another feature of the present invention resides in a display that is capable of displaying an image in multiple colors using a simple structure for the components.

A further aspect of the present invention resides in a compact display structure.

Still another feature of the present invention resides in a display suited for a game apparatus of a hand-held type or desk-top type.

BRIEF FIGURE DESCRIPTION

In order that the invention may be clearly understood, it will now be described, by way of example, with reference to the accompanying drawings, wherein.

DETAILED DESCRIPTION OF PREFERRED EMBODIMENTS AND OF THE BEST MODE OF THE INVENTION

Figure 2:
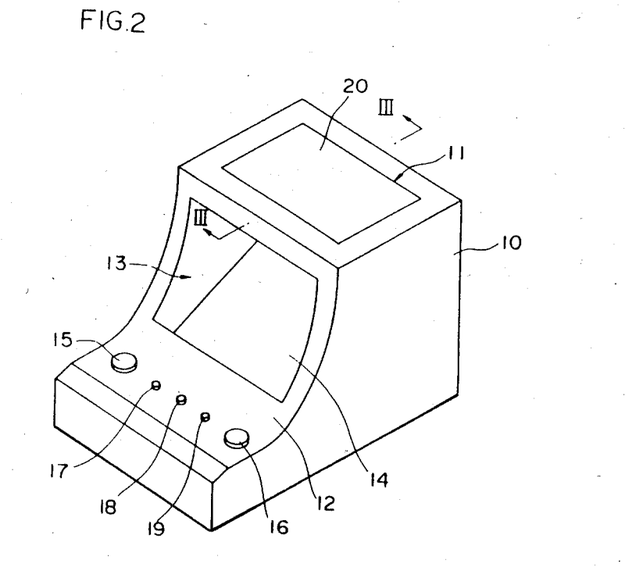
FIG. 2 is a perspective view showing one embodiment of a display apparatus of the present invention.
Figure 3:
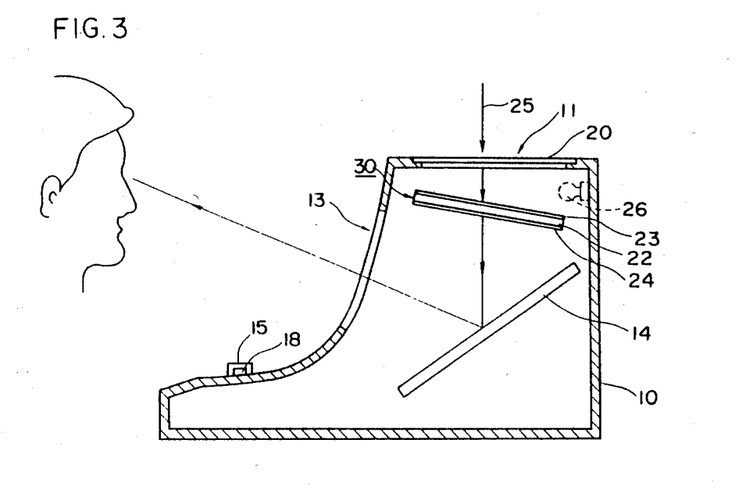
FIG. 3 is a sectional view taken along the line III—III in FIG. 2.

FIG. 2 is a perspective view showing one embodiment of a display housing of the present invention as embodied in a game apparatus of the desk-top type. FIG. 3 is a sectional view taken along the line III—III in FIG. 2 and shows the structural features of the present invention. The circuit for driving a liquid crystal display has been omitted to facilitate the description. Referring to FIGS. 2 and 3, a housing 10 has a top wall or surface with a light transmitting portion 11 for transmitting light from the outside into the inside of the housing 10. The light transmitting portion 11 or inlet window comprises a ground glass 20 for scattering the incoming light 25 uniformly into the housing 10. A polyethylene sheet of a rough surface may be used in place of the ground glass 20. In such a case, a transparent glass is first mounted on or in the light transmitting portion 11 and then the polyethylene sheet may be mounted on the clear glass. The front surface or wall 12 of the housing 10 is formed as a cruved surface. A viewing window 13 is provided in a portion of the front surface of the housing 10. The housing 10 is further provided at the other wall portions of the front surface 12 with mode switches 17 to 19 and character moving and/or changing switches 15 and 16, as in the case of FIG. 1. Except for the inlet window 11 and for the viewing window 13, the walls of the housing 10 are made of an opaque material for screening out external light other than light passing through said inlet window 11.

A liquid crystal plate 30 and a mirror 14 are held inside the housing 10 at a predetermined positional relation. More specifically, the liquid crystal plate 30 is disposed below the light inlet window 11 so that the light 25 coming from the outside through the ground glass 20 is directly applied to the liquid crystal plate which comprises a twisted nematic type liquid crystal layer 22 and polarized filters 23 and 24 formed on both surfaces thereof. However, in the case where any other type of liquid crystal layer is employed, a polarized filter may be provided only on one surface thereof or the filter may be omitted. The mirror 14 is disposed further below the liquid crystal plate 30 at a predetermined angle so that light transmitting through the liquid crystal plate 30 is reflected from the mirror 14 in a direction for viewing through the viewing window 13 providing a given angular observation range when the housing 10 is in its use attitude on a support surface. Accordingly, a user can observe through the window 13 an image being displayed by the liquid crystal plate 30 as projected onto the mirror 14. Preferably, the mirror 14 is disposed at an angle of approximately 45° with respect to the liquid crystal plate 30. Experiments made by the present inventor have shown, that an image being displayed through the liquid crystal plate, becomes most clearly visible with this arrangement because the above mentioned opaque housing material encloses the mirror 14 to screen out external light to thereby increase the contrast caused by light passing through the window 11.

Figure 17:
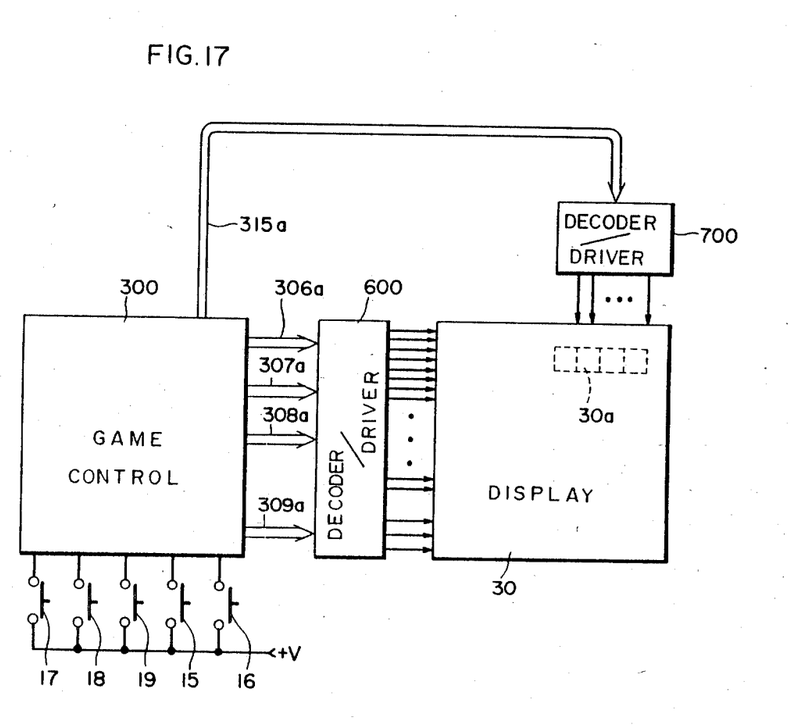
FIG. 17 is a block diagram showing an outline of a liquid crystal display control of the embodiment of FIG. 2.

FIG. 17 is a block diagram showing a liquid crystal display control suitable for the embodiment of FIG. 2. Basically the liquid crystal display control comprises a game control circuit 300. The display 30 is connected to be driven by a decoder/driver 600 for receiving a signal from the game control circuit 300 and for displaying a figure, and a decoder/driver 700 for receiving a signal from the game control circuit 300 and for displaying a numerical value. The game control circuit 300 is connected to the various switches 15, 16, 17, 18 and 19 described in conjunction with FIG. 2. The game control circuit 300 is responsive to operation or an operation state of the character moving/changing switches 15 and 16 for supplying the data for driving the segment electrodes formed on the display 30 through data buses 306a, 307a and 308a for providing a display image. The game control circuit 300 is further responsive to operation of the mode switches 17, 18 and 19 to supply the data for selecting a game start or a game mode to the decoder/driver 600 through a data bus 309a. At the same time the game control circuit 300 provides score point data attained by a player through operation of the character moving/changing switches 15 and 16 through a bus 315a to the decoder/driver 600. Accordingly, the display 30 displays the score point data at the numerical value display portion 30a.

The embodiment of FIG. 2 is constructed as described above. Hence, the angle at which the image being displayed by the liquid crystal plate 30 is observed, is substantially constant. As a result, the observation is always easy. Furthermore, since the side where the user or player observes the image being displayed by the liquid crystal plate 30 and the side where the light 25 from the outside is entering into the liquid crystal plate 30 form different walls of the housing, an image being displayed can be clearly observed without being influenced by the surrounding brightness.

Figure 4:
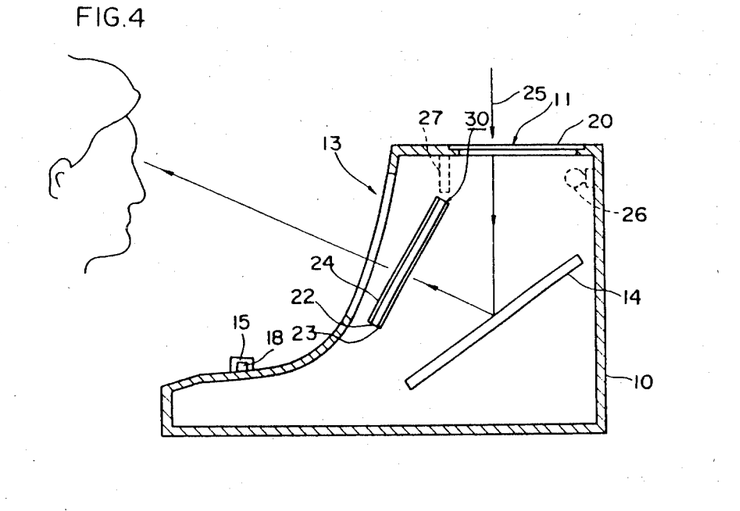
FIG. 4 is a view similar to FIG. 3 of another embodiment of the present invention.

FIG. 4 shows an embodiment similar to that of FIG. 3, but with a modification. In FIG. 4, the mirror 14 is disposed below the light transmitting portion 11 of the housing 10 so that light 25 from the outside passing through the ground glass 20 may be directly received by the mirror 14. The mirror 14 is held in the housing 10 at an angle selected such that the received light may be reflected thereby in the direction toward the viewing window 13. The liquid crystal plate 30 is held in the housing 10 so as to be positioned between the window 13 and the mirror 14. Accordingly, in the embodiment of FIG. 4 a viewer directly observes the liquid crystal plate 30 through the window 13. The light transmitting portion 11 is not provided above the liquid crystal plate 30. As a result, the light 25 coming from the outside through the light transmitting portion 11 does not directly impinge upon the liquid crystal plate 30, but passes through the plate 30 after reflection, whereby an image being displayed by the liquid crystal plate 30 can be observed even more clearly. Preferably, a light shielding plate 27 may be provided as shown by the dotted line in FIG. 4.

As in the case of the embodiment shown in FIGS. 2 and 3, the embodiment of FIG. 4 also separates the side where the liquid crystal plate 30 is observed by a viewer and the side where light 25 coming from the outside enters the liquid crystal plate 30. In both instances it is possible to observe an image being displayed clearly without being influenced by the surrounding brightness.

By providing a light source 26 to be energized by a battery, not shown, for example as shown by the dotted line in FIGS. 3 and 4, an image being displayed by the liquid crystal plate 30 can be clearly observed even in the dark. Since it would be seldom that an image being displayed is observed using such light source 26, power consumption by the light source 26 may be small. Usually an external, incident light is available from above, hence the light transmitting portion 11 is provided on top of the housing 10 in the embodiments shown in FIGS. 2 to 4, so that the best light receiving condition may be attained. However, depending on the positional situation between the liquid crystal plate 30 and the mirror 14, the light transmitting portion 11 may be provided at the side or the rear of the housing 10.

Figure 5:
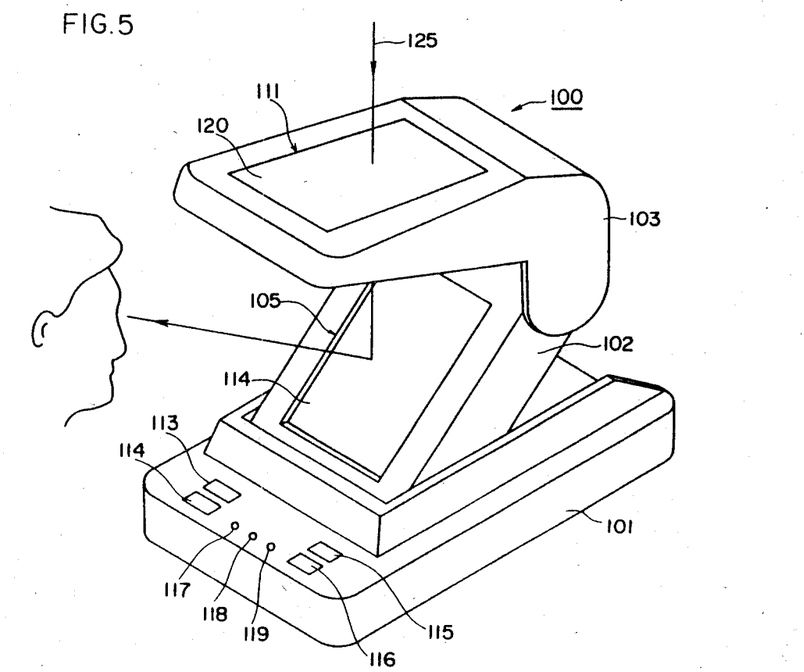
FIG. 5 is a perspective view showing a further embodiment of the present invention.
Figure 6:
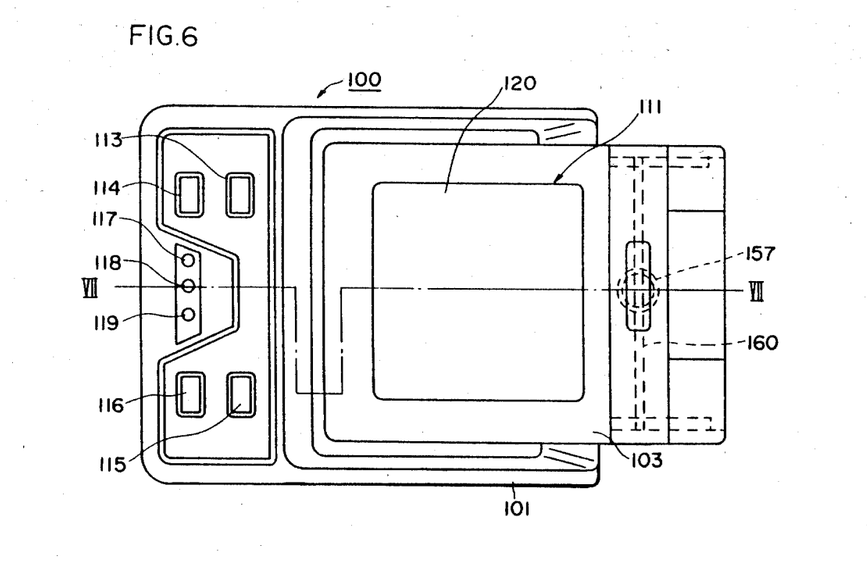
FIG. 6 is a plan view of the embodiment of FIG. 5.

FIG. 5 is a perspective view showing a hand-held type game apparatus in accordance with still a further embodiment of the present invention and particularly in its use state. FIG. 6 is a plan view of the embodiment of FIG. 5. The liquid crystal display basically comprises a base 101, a first housing portion 103 and a second housing portion 102. The base 101 is provided with character moving/changing switches 113 to 116 and game mode switches 117 to 119, as in the case of FIG. 1. The second housing portion 102 is rotatably supported at one end thereof by the base 101. A mirror 114 is housed in the second housing portion 102. A window 105 is formed in the second housing portion 102, so that the mirror 114 may be exposed. On the other hand, the first housing portion 103 is rotatably supported at one end thereof by the other end of the second housing portion 102. A liquid crystal plate to be described below is housed in the first housing portion 103. A light transmitting portion 111 for transmitting light 125 from the outside into the inside of the housing 103 is provided on the top surface of the first housing portion 103. A ground glass cover 120 is mounted to the light transmitting portion 111 to form a light scattering means. Provision of the ground glass 120 makes it possible to scatter the light 125 from the outside uniformly onto the surface of the liquid crystal plate housed in the first housing portion 103. A polyethylene sheet having a rough surface may be utilized in place of the ground glass 120.

Although not shown in FIG. 5, a light transmitting window (see FIG. 8) is formed on the lower surface of the first housing portion 103. Accordingly, the light 125 from the outside is introduced through the ground glass cover 120 into the inside of the first housing portion 103 and impinges upon the mirror 14 after the light has passed through the liquid crystal plate (see FIGS. 7 and 8) housed inside the first housing portion 103. The light reflected from the mirror 114 is observed by a viewer. More specifically, the viewer observes an image being displayed by the liquid crystal plate as projected onto the mirror 114.

Figure 7:
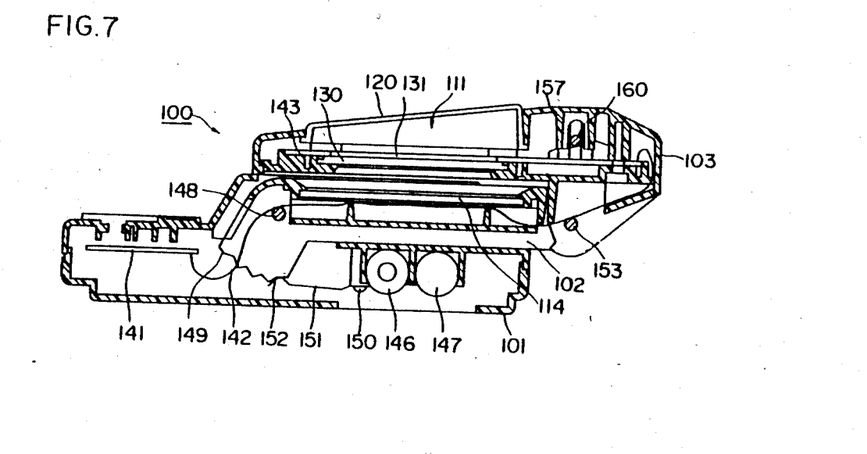
FIG. 7 is a sectional view taken along the line VII—VII in FIG. 6.
Figure 8:
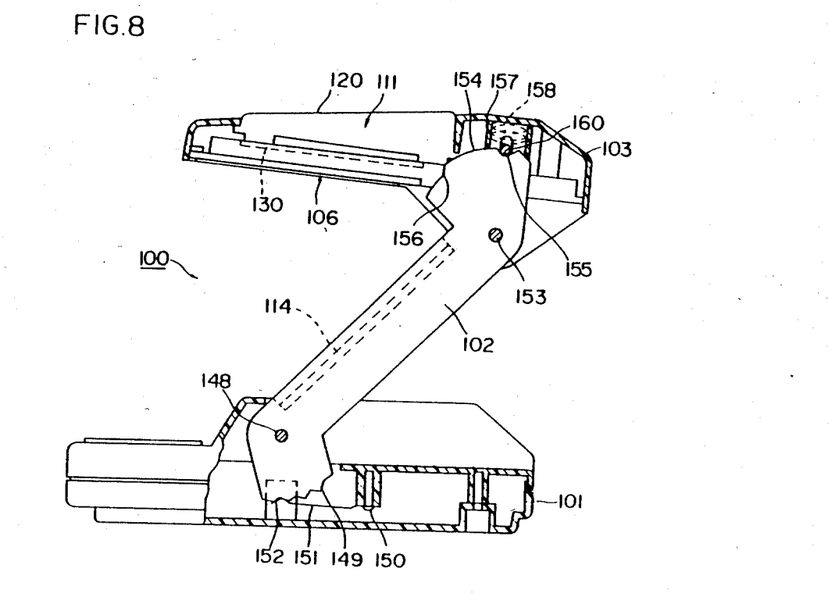
FIG. 8 is a partially sectional fragmentary right side view of the embodiment of FIG. 5.

FIG. 7 is a sectional view taken along the line VII—VII in FIG. 6. FIG. 8 is a right side view, partially fragmentary, of FIG. 5. Referring to FIGS. 7 and 8, the structure of the liquid crystal display 100 will be described in more detail. As shown in FIG. 7, the base 101 is provided with a switch base plate 141. The switch base plate 141 is connected to one end of an electrical conductor line 142. The line 142 passes through the inside of the second housing portion 102 into the first housing portion 103. A liquid crystal display base plate 143 is mounted inside the first housing portion 103 and the other end of the conductor line 142 is connected to a liquid crystal driving means, not shown, formed on the liquid crystal display base plate 143. The liquid crystal plate 130 is held on a shoulder of the plate 143 for facing the light transmitting portion 111 and the light transmitting window 106. The liquid crystal plate 130 is driven by the liquid crystal display driver provided on the liquid crystal display base plate 143. Batteries 146 and 147 are housed in the base plate 101 so that electric power required for driving the liquid crystal plate 130 is supplied by these batteries 146 and 147. A color filter 131 for enabling a multicolored display is provided on the liquid crystal plate 130. The color filter 131 will be described below.

The second housing portion 102 is pivoted by a shaft 148 supported at both ends thereof by the base 101, whereby the portion 102 is mounted onto the base 101. The second housing portion 102 is bent near one end thereof, so that an end surface 149 of the bent portion is movable along an arc with the shaft 148 as the center of the arc. A plurality of recesses, for example corrugated recesses, are formed at the end surface 149 of the bent portion. A leaf spring 151 fixed by means of a screw 150 inside the base 101 has a protruding spring end 152 and extends toward the corrugated end surface to fit into one of the recesses, whereby the second housing portion 102 is tiltably supported on the base 101. If and when the second housing portion 102 is raised or turned down against the spring force of the leaf spring 151, the protruding spring end 152 may fit into any of the recesses. Accordingly, the second housing portion 102 is held at a stepwise adjustable angle as selected with respect to the base 101.

One end of the first housing portion 103 is journalled by the shaft 153 supported by the second housing portion 102 at both ends thereof, so that the same is rotatably or tiltably supported with respect to the second housing portion 102. The second housing portion 102 has the other end bent in the direction opposite to the bending direction in the vicinity of its lower end described above. The upper bent portion is formed in a fan shape with the shaft 153 as the center of the fan. Recesses 155 and 156 are formed on the arcuate surface 154 of the bent portion. A cylinder or recess 157 having a notch extending upwardly and substantially parallel to the plane of the liquid crystal display 100 is located in the top part of the first housing portion 103. A spring 158 is mounted inside the recess or cylinder 157. A shaft 160 is mounted in the notch of the cylinder 157 and extends substantially in parallel to the liquid crystal display 100. The shaft 160 is normally urged by the spring 158 to be in pressure contact with the arcuate surface 154 at the end of the second housing portion 102. Therefore, with the display unit 100 folded, the shaft 160 is fitted into the recess 156, whereby a folded state is maintained. Conversely, when the display unit 100 is expanded as shown in FIG. 8, the shaft 160 is fitted into the recess 155, whereby the first housing portion 103 is maintained in the expanded condition relative to the second housing portion 102. Thus, the shaft 160 serving as a supporting member of the first housing portion 103 simply snaps into the notch of the cylinder 157, without the necessity of any tiresome step of screwing. Therefore, the assembling operation is simplified and the number of components such as screws can be decreased.

According to experimentation, an image to be displayed by the liquid crystal plate 130 can be most readily viewed when the surface opposing angle of the liquid crystal plate 130 and the mirror 114 is approximately 45°. Therefore, the apparatus is constructed so that the surface opposing angle of the first housing portion 103 and the second housing portion 102 may be approximately 45° with the shaft 160 fitted into the recess 155.

As is clear from the above described structure, in the embodiment of FIG. 5 the housing side or wall where the liquid crystal plate 130 is viewed by a viewer and the housing side or wall where the light 125 from the outside is introduced onto the liquid crystal plate 130 are different housing walls. Therefore, an image being displayed can be viewed very clearly without being influenced by the surrounding brightness. Furthermore, since the housing portions 102 and 103 are separate and rotatably coupled, these housing portions 102, 103 are foldable whereby a very compact liquid crystal display unit is provided. In addition, since the base 101 and the second housing 102 are structured so that the folding angle therebetween is selectable, the light receiving direction and the reflecting direction from the mirror can be adjusted depending upon the surrounding condition, with the result that always the best display state can be attained.

Figure 9:
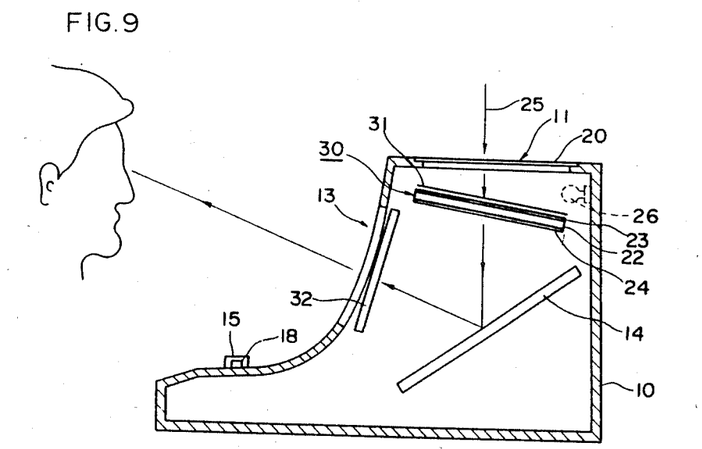
FIG. 9 is a sectional view of a still further embodiment of the present invention.

FIG. 9 is a sectional view of a further embodiment of the present invention similar to the embodiment of FIG. 3, except that a color filter 31 for displaying characters in multiple colors is provided in the vicinity of the liquid crystal plate 30 and a smoked plate 32 is provided in the vicinity of the window 13. Elements of the embodiment of FIG. 9, other than the above described different elements, are denoted by the same reference characters and a detailed description thereof is omitted since they are substantially the same as in FIG. 3. The color filter 31 comprises a plurality of color regions to be described in more detail below, whereby the characters being displayed can be displayed in multiple colors. The smoked plate 32 may be an acrylic resin plate of a natural gray. Provision of the smoked plate 32 in the vicinity of the window 13 can prevent the surface of the liquid crystal plate facing the polarized filter 24 from becoming too light due to light incident from the window 13. Thus, the plate 32 may increase the clearness of the display.

Figure 10:
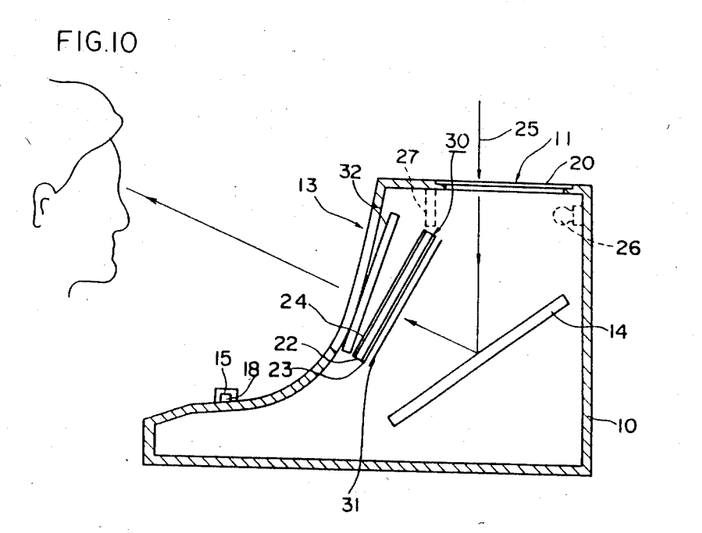
FIG. 10 is a sectional view of yet another embodiment of the present invention.

FIG. 10 is a sectional view of a further embodiment of the present invention which is similar to the embodiment of FIG. 4, except that a color filter 31 for displaying characters in multiple colors is provided in the vicinity of the liquid crystal plate 30 and a smoked plate 32 is provided in the vicinity of the window 13. Other components are denoted by the same reference characters and a detailed description is omitted. The effects being brought about by the color filter 31 and the smoked plate 32 are also the same as in FIG. 9.

Figure 11:
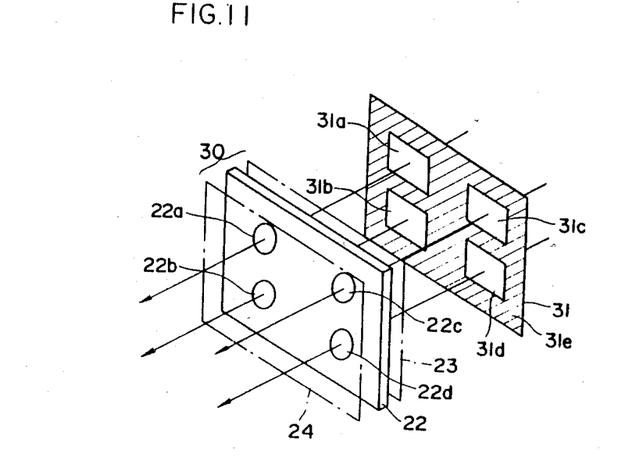
FIG. 11 shows a perspective view of one example of a preferred arrangement of the liquid crystal plate and of the color filter for use in the embodiments shown in FIGS. 9 and 10.

FIG. 11 is a view showing a preferred example of the liquid crystal plate 30 and the color filter 31 for use in the embodiments depicted in conjunction with FIGS. 9 and 10. Display segments 22a, 22b, 22c and 22d are formed on the liquid crystal layer 22. The liquid crystal layer 22 is of a twisted nematic type, as described above and the polarized filters 23 and 24 are provided on both surfaces. The polarization axis of these polarized filters 23 and 24 are selected in a predetermined relation, so that the light beam incident upon the portion other than the display segments 22a to 22d being selectively driven for display may not transmit therethrough. More specifically, the liquid crystal plate 30 comprising the liquid crystal layer 22 and the polarized filters 23 and 24 transmits a light beam only at the display segment portions being selectively driven for display.

Such a structure may be implemented using a liquid crystal layer of a type other than a twisted nematic type. However, employment of a twisted nematic type in a liquid crystal layer makes it possible to provide the above described liquid crystal plate 30 in a very simple structure.

A color filter 31 is disposed in the vicinity of and so as to face the above described liquid crystal plate 30. The color filter 31 comprises a transparent film, for example made of polyester. The transparent film includes filter portions 31a to 31d and an opaque portion 31e as hatched in FIG. 11 formed through a screen process. The filter portions 31a to 31d are formed to cover at least the display segments 22a to 22d at the positions facing the display segments 22a to 22d, respectively. These filter portions 31a to 31d are each formed as a filter allowing for transmission of light having a color in which display of the display segments 22a to 22d is desired. For example, if it is desired that the display segment 22a is displayed in red, the display segment 22b is displayed in yellow, the display segment 22c is displayed in blue and the display segment 22d is displayed in green, the filter portion 31a is formed as a red color filter, the filter portion 31b is formed as a yellow color filter, the filter portion 22c is formed as a blue color filter, and the filter portion 22d is formed as a green color filter. Such color filter 31 may be implemented by forming the filter portions 31a to 31d and the opaque portion 31e separately whereupon these members are combined to constitute the color filter 31.

Figure 12:
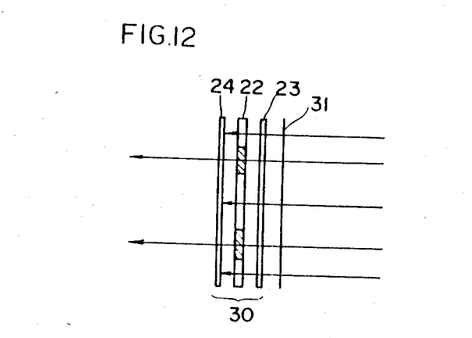
FIG. 12 is a sectional view through FIG. 11.

FIG. 12 is a sectional view through FIG. 11. As shown in FIG. 12, light transmitted through the color filter 31 impinges upon the liquid crystal plate 30, whereby only the display segment portion being selectively driven for display will transmit light. The reason is that only the polarization axis of the light beam transmitted through the display segment being selectively driven for display coincides with the polarization axis of the polarization filter 24, whereas the light beam transmitted through the other portion deviates by 90° from the polarization axis of the polarization filter 24.

Since the filter portions 31a to 31d are disposed to face the display segments 22a to 22d, respectively, the display segments 22a to 22d can be displayed in desired colors.

Figure 13:
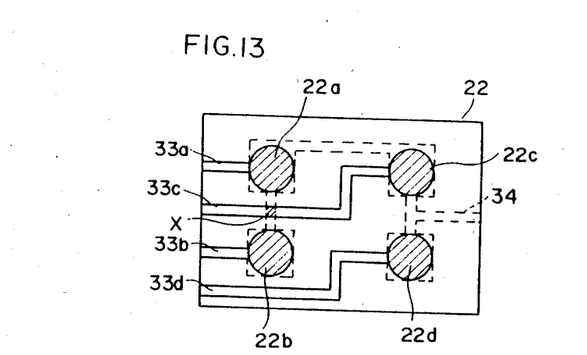
FIG. 13 is a view for explaining the advantage of the color filter shown in FIG. 11.

FIG. 13 is a view showing the advantage of the color filter 31 shown in FIG. 11. The liquid crystal layer 22 is formed with a common electrode 34 shown by the dotted line and a plurality of segment electrodes 33a to 33d. The overlapping portions, as hatched, between the segment electrodes 33a to 33d and the common electrode 34 constitute the display segments 22a to 22d, respectively, shown in FIG. 11. If it is desired to display the display segment 22a, for example, using the above described liquid crystal layer 22, a voltage is applied between the segment electrode 33a and the common electrode 34 by means of a display driving circuit, not shown. In forming an image in the liquid crystal layer 22, it is necessary that the segment electrode and the common electrode coincide with each other. However, depending on the arrangement or the number of the display segments 22a to 22d, it could happen that an overlapping portion X of the electrodes is formed at a portion other than the display segments 22a to 22d, as shown in FIG. 13. If and when the display segment 22c is to be displayed in the embodiment of FIG. 13, for example, the overlapping portion X of the electrodes could also be displayed, whereby an image could appear in an undesired portion. Therefore, in drafting an image being displayed on the liquid crystal layer 22, the portion for extension of the common electrode and the segment electrodes was restricted in order to avoid such undesired display of an image. However, by employing the color filter 31 shown in FIG. 11, such overlapping portion X of the electrodes can be concealed by an opaque portion 31e of the color filter 31 and therefore an advantage is brought about in that the common electrode and the segment electrodes 33a to 33d can be extended as desired. However, if such advantage is not desired, alternatively the color filter may be implemented without forming such opaque portion 31e.

Figure 14:
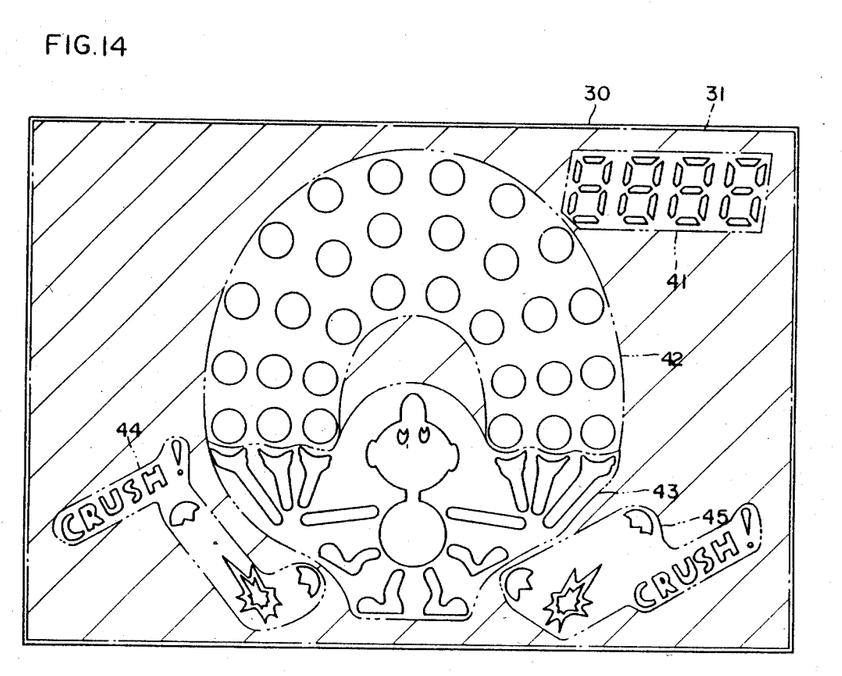
FIG. 14 is a view showing one example of a display embodied as a game apparatus.

FIG. 14 is a view showing one example of a display of the present invention in a game apparatus. The liquid crystal plate 30 is formed with a variety of display segments such as numeral characters for displaying the current time and a score point, a ball character for displaying a ball symbol, a person character for displaying a person symbol, and other decorating characters for displaying various characters and figures. A color filter 31 is disposed to face the liquid crystal plate 30. The color filter 31 has a filter portion 41 so as to cover the numeral characters. The color filter 31 further has filter portions 42, 43, and 44 and 45 to cover the ball character, the person character, and the decorating characters, respectively. Accordingly, in the embodiment of FIG. 14 the numeral character, the ball character and the person character and the decorating characters can be displayed in different colors, respectively. An opaque portion is formed, as described above, in the hatched portion, other than the filter portions 41 to 45 in the color filter 31.

By thus implementing a game apparatus employing a liquid crystal display capable of displaying game patterns in multiple colors, color changes are added to such game apparatus employing a liquid crystal display whereby playing a game becomes more interesting.

Figure 15:
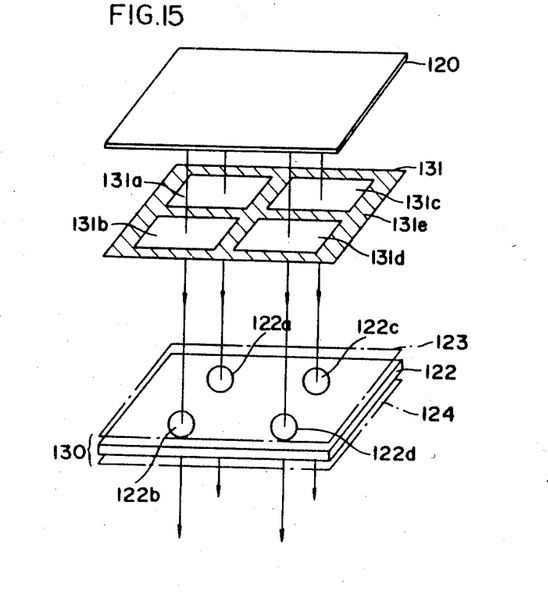
FIG. 15 is a view showing one example of a preferred arrangement of the liquid crystal plate and of the color filter for use in the embodiment of FIG. 5.

FIG. 15 is a view showing a preferred example of the liquid crystal plate 130 and the color filter 131 for use in the embodiment of FIG. 5. As in the case of the embodiment of FIG. 11 the display segments 122a, 122b, 122c and 122d of the character configurations being displayed are formed in the liquid crystal layer 122. The liquid crystal layer 122 may be a liquid crystal layer of a twisted nematic type having the polarization filters 123 and 124 formed on both surfaces thereof. The polarization axes of these polarization filters 123 and 124 are selected to be in a predetermined relation, so that light incident upon portions other than the display segments 122a to 122d being selectively driven for display, may not transmit therethrough. More specifically, the liquid crystal layer 122 and the polarization filters 123 and 124 are so constructed that a light beam is allowed to transmit only the display segment portions which are selectively driven for display.

A color filter 131 is disposed to face the liquid crystal plate 130. The color filter 131 comprises a transparent film such as polyester, as in FIG. 11. The transparent film has filter portions 131a to 131d and the opaque hatched portion 131e formed by a screening process. These filter portions 131a to 131d are formed at the positions facing the respective display segments 122a to 122d so as to cover the respective display segments. These filter portions 131a to 131d transmit light having colors in which it is desired to display the display segments 122a to 122d.

Since the embodiment of FIG. 15 is so constructed that the filter portions 131a to 131d are disposed to cover at least the display segments 122a to 122d having the character configurations being displayed, the display segments 122a to 122d can be displayed in desired colors, respectively, as in FIG. 11.

Figure 16:
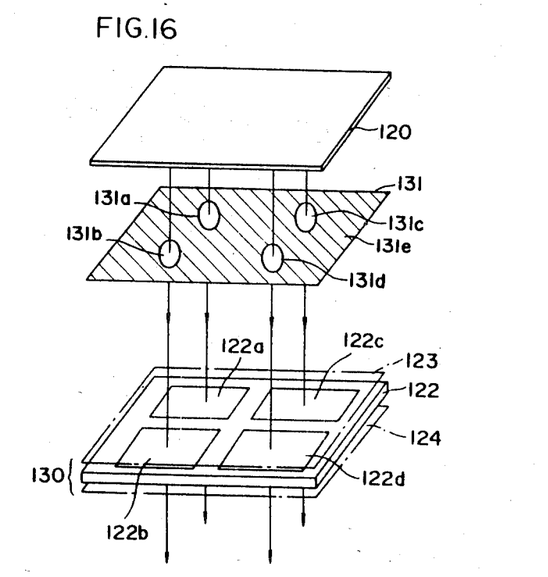
FIG. 16 is a view showing an example of another preferred arrangement of the liquid crystal plate and the color filter for use in the embodiment of FIG. 5.

FIG. 16 is a view showing another preferred example of the liquid crystal plate 130 and the color filter 131 for use in the embodiment of FIG. 5. Contrary to the embodiment of FIG. 15 the embodiment of FIG. 16 is adapted so that the filter portions 131a to 131d of the color filter 131 are formed in the shape of the characters being displayed. The display segments 122a to 122d of the liquid crystal layer 122 are formed to be large enough to cover the filter portions 131a to 131d, respectively. The remaining portions may be substantially the same as those in FIG. 15. With such structure, when a given display segment of the liquid crystal plate 130 is driven to be made transparent for a display, light passes through only the color filter portion facing the above described display segment. Therefore, an image of the configuration of the color filter portion, i.e., the character configuration being displayed, can be displayed in color. Accordingly, the liquid crystal display plate of FIG. 16 also performs substantially the same effect as that of FIG. 15.

In the foregoing disclosure a liquid crystal display as embodied in a game apparatus has been mainly described. However, the present invention can be applied also to any other type of electronic apparatus such as a timepiece, a calculator and the like.

Although the present invention has been described and illustrated in detail, it is to be understood that the same is by way of illustration and example only and is not to be taken by way of limitation, the spirit and scope of the present invention being limited only by the terms of the appended claims.

What is claimed is:

1. A game apparatus for playing a video type game, comprising housing means made of an opaque material, a mirror mounted in a recessed position in said housing means for forming at least one viewing surface inside said housing means, a light transmitting portion in said housing means for introducing light in an incoming direction from above into said housing means, said light transmitting portion having light scattering means for scattering said light into said housing means, a liquid crystal plate located below and close to said light transmitting portion inside said housing means for receiving said light from said light transmitting portion and for selectively transmitting light for displaying a plurality of characters in an outgoing direction on said viewing surface formed on said mirror, said liquid crystal plate having a plurality of display segments becoming transparent when driven, color filter means located in a face-to-face manner relative to at least one surface of said liquid crystal plate, said color filter means including a plurality of color filter regions, each color filter region facing a respective one of said display segments of said liquid crystal plate so that a color filter region and the respective display segment form members of a pair, one of said members of a pair being shaped as the respective character of said characters and the other of said members of a pair having a size covering said character, and wherein at least two of said plurality of color regions of said color filter means are of different colors, said apparatus further comprising window means located in said housing means for allowing light to pass therethrough in said outgoing direction as reflected by said mirror forming said viewing surface located inside said housing means, whereby light is transmitted through said liquid crystal plate toward said window means by the reflection on said mirror, said recessed mirror being spaced inside said housing sufficiently away from said window means so that said opaque material of said housing means screens out external light other than said light passing through said light transmitting portion for increasing the contrast of an image on said viewing surface, said apparatus further comprising display control means located inside said housing means and responsive to internal programs or operation signals provided thereto for selectively driving said display segments of said liquid crystal plate for playing a game, operating means located in or on said housing means forward of said mirror in said outgoing direction and at a position below the light transmitted in said outgoing direction, said operating means being operatively connected to said display control means for providing said operation signals for said display control means.

2. The game apparatus of claim 1, wherein said liquid crystal plate and a reflecting surface of said mirror are oriented in said housing means with a predetermined opposing angle relative to each other.

3. The game apparatus of claim 2, wherein said predetermined opposing angle is approximately 45°.

4. The game apparatus of claim 1, wherein said housing means comprises first and second housing sections, said light transmitting portion being located in said first housing section, said liquid crystal plate being fixedly held in a light path from said light transmitting portion of said first housing section, wherein said mirror is held in a predetermined position in said second housing section, and wherein said window means is formed in association with said mirror in said second housing section, said game apparatus further comprising first connecting means for connecting said first and second housing sections to each other so that said liquid crystal plate and said mirror may be opposed to each other with a given opposing angle.

5. The game apparatus of claim 4, wherein said first connecting means comprises first position adjustment means for fixing said first housing section and said second housing section in such a position relative to each other that the angle therebetween may be adjusted.

6. The game apparatus of claim 5, wherein said first adjustment means comprises means for holding said first housing section and said second housing section in a folded manner.

7. The game apparatus of claim 5, wherein said first adjustment means comprises at least one engageable member formed on at least one end of said first housing section and on one end of said second housing section, at least one engaging member formed on at least the other end of said first housing section and on said second housing section, said first and second housing sections being fixed through engagement of said engaging member with said engageable member.

8. The game apparatus of claim 5, wherein said housing means comprises a base, and second connecting means for connecting said base to the other end of said second housing section.

9. The game apparatus of claim 8, wherein said second connecting means comprises second position adjustment means for fixing the position of said first housing section, of said second housing section and of said base so that the angle therebetween may be adjusted.

10. The game apparatus of claim 9, wherein said first position adjustment means comprises means for holding said first housing section and said second housing section in a folded manner, and wherein said second position adjustment means comprise means for holding said second housing section and said base in a folded manner.

11. The game apparatus of claim 9, wherein said second position adjustment means comprise position determining means on said first housing section and on said base, said position determining means cooperating with each other for adjustably holding said housing sections and said base in predetermined positions relative to each other.

12. The game apparatus of claim 8, wherein said operating means are disposed at a predetermined position on said base.

13. The game apparatus of claim 4, wherein said housing further comprises a base, and second connecting means for connecting said base to the other end of said second housing section.

14. The game apparatus of claim 13, wherein said first and second connecting means comprise means for holding said first and second housing sections alternatively in a folded or open position.

15. The game apparatus of claim 14, wherein said first and second connecting means comprise position determining means for holding said housing sections and said base in a predetermined open or folded position relative to each other.

16. The game apparatus of claim 1, wherein said liquid crystal plate comprises a liquid crystal layer of a twisted nematic type, and at least one polarized filter (23, 24) laminated to at least one surface of said liquid crystal layer.

17. The game apparatus of claim 1, wherein said housing means comprise first and second housing sections, said light transmitting portion, said liquid crystal plate, and said color filter means being located in said first housing section, wherein said mirror is mounted in said second housing section and forms a display screen in said second housing section, and connecting means operatively interconnecting said first and second housing sections in different positions relative to each other, whereby light (125) passes through said first housing section onto said mirror in said second housing section when the two housing sections are held in a predetermined open position relative to each other by said connecting means, and wherein said first housing section forms a closure and cover for said display screen when said first and second housing sections are held in a closed position relative to each other by said connecting means.

* * * * *